United States Patent [19]
Akagi

[11] Patent Number: 4,552,249
[45] Date of Patent: Nov. 12, 1985

[54] MOUNTING DEVICE FOR SPIRAL SPRING
[75] Inventor: Motonobu Akagi, Kariya, Japan
[73] Assignee: Aisin Seiki Kabushiki Kaisha, Kariya, Japan
[21] Appl. No.: 461,384
[22] Filed: Jan. 27, 1983
[30] Foreign Application Priority Data Feb. 3, 1982 [JP] Japan .............................. 57-13772[U]

[51] Int. Cl.[4] .............................................. F03G 1/08
[52] U.S. Cl. ........................................ 185/39; 185/37; 185/45
[58] Field of Search .............................. 185/45, 37, 39; 267/156; 251/75, 130; 236/101 D; 374/207; 368/140, 144, 145, 147, 153, 175; 74/531

[56]   References Cited
U.S. PATENT DOCUMENTS

| 1,292,267 | 1/1919 | Dawson et al. | 185/37 |
| 1,649,826 | 11/1927 | Gunderman | 185/45 |
| 2,372,932 | 4/1945 | Brockman | 185/39 X |
| 2,714,000 | 7/1955 | O'Conner et al. | 267/156 |
| 2,996,071 | 8/1961 | Takaoka | 251/75 X |
| 3,120,291 | 2/1964 | Nicholas et al. | 185/39 |
| 3,122,351 | 2/1964 | Brown | 185/39 X |
| 3,227,244 | 1/1966 | Pelenc | 185/39 |
| 3,279,744 | 10/1966 | Fieldsen et al. | 251/130 |
| 4,307,752 | 12/1981 | Inada et al. | 137/625.48 |

Primary Examiner—Leslie A. Braun
Assistant Examiner—Dwight G. Diehl
Attorney, Agent, or Firm—Oblon, Fisher, Spivak, McClelland & Maier

[57]   ABSTRACT

A mounting device for a spiral spring which includes a rotatable shaft, a casing having a wall through which a first end of said rotatable shaft extends, a spiral spring for biasing the rotatable shaft in one direction, the spiral spring having an inner end which is engaged with the first end of the rotatable shaft, a spring holder positioned within the casing and having a first projection extending therefrom with which an outer end of the spiral spring is engaged, and a cover fitted within the casing covering the spiral spring and engaging with the spring holder so as to be rotated therewith and for thereby adjusting the biasing force of the spiral spring.

4 Claims, 4 Drawing Figures

MOUNTING DEVICE FOR SPIRAL SPRING

BACKGROUND OF THE INVENTION

1. Field of the Invention

This invention relates to a mounting device for a spiral spring and more particularly to a mounting device for spiral spring which biases a rotatable shaft in one direction.

2. Description of the Prior Art

Conventionally, a spiral spring has been proposed which biases in one direction a rotatable shaft of, for example, a rotary valve wherein the flow of fluid is controlled in response to rotation of the rotatable shaft. One end of such spiral spring may be connected to the rotatable shaft while the other end of the spiral spring may be connected to a stationary member. Such spiral spring has, however, no adjusting means for adjusting the biasing force thereof, and therefore, it is difficult to properly set or position the spiral spring.

SUMMARY OF THE INVENTION

Therefore, it is an object of the present invention to provide a new and improved mounting device for a spiral spring which obviates the above-mentioned prior drawback.

It is another object of the present invention to provide a new and improved mounting device for a spiral spring which includes adjusting means for adjusting the biasing force of the spiral spring.

In accordance with the present invention, a mounting device for a spring is provided which includes a rotatable shaft, a casing having a wall through which a first end of said rotatable shaft extends; spiral spring means for biasing said rotatable shaft in one direction, said spiral spring having an inner end which is engaged with said first end of said rotatable shaft; a spring holder positioned within said casing and having a first projection extending therefrom with which an outer end of said spiral spring means is engaged; and cover means fitted within said casing for covering said spiral spring and engaging with said spring holder so as to be rotated therewith and for thereby adjusting the biasing force of said spiral spring.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
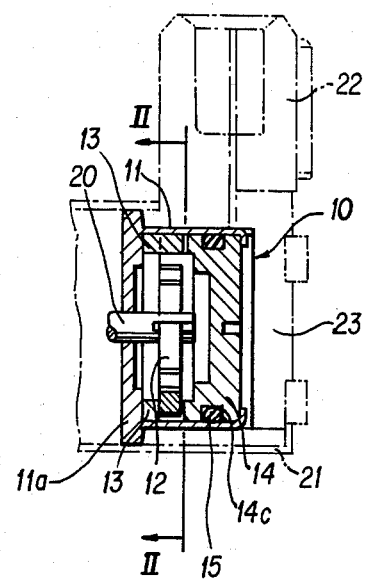
FIG. 1 is a cross sectional view of a mounting device for a spiral according to the present invention.

In FIG. 1, a mounting device 10 of a spiral spring according to the present invention is applied to, for example, a rotatable shaft 20 of a rotary valve which is electromagnetically actuated. The mounting device 10 comprises a cylindrical casing 11 of metal, a spiral spring 12 mounted on one end of the rotatable shaft 20, an annular spring holder 13 coaxially fitted within the casing 11 and a cover 14. The casing 11 is securely fitted to a terminal holder 22 of resinous material which is secured to one end of a housing 21 of the rotary valve and has a wall 11a through which one end of the rotatable shaft 20 extends.

Figure 2:
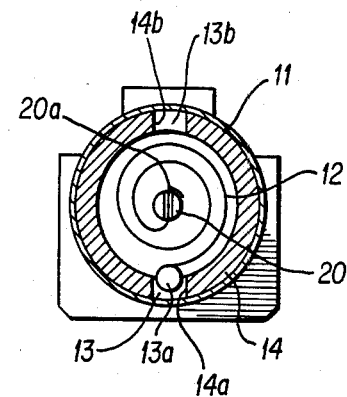
FIG. 2 is a cross sectional view taken along line II—II of FIG. 1.

As shown in FIG. 2, the spring holder 13 has a pin-shaped first projection 13a which is projected as a single body from a part of the circumferential wall thereof. The spring holder 13 also has a second projection 13b of substantially square configuration in cross section which is projected as a single body from the circumferential wall thereof and which is opposite the first projection 13a. The outer end of the spiral spring 12 is engaged with the first projection 13a of the spring holder 13 while the inner end of the spiral spring 12 is bent so as to be securely fitted within a groove 20a formed in one projecting end of the rotatable shaft 20.

Figure 3:
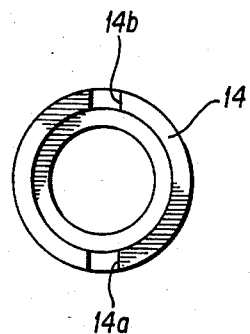
FIG. 3 is a plan view showing an inner end surface of a cover of FIG. 1.

The cover 14 has on an annular inner surface thereof a pair of radial notches 14a and 14b as shown in FIG. 3 and also has on the outer periphery thereof an annular groove 14c which receives an O-ring 15 therein.

Figure 4:
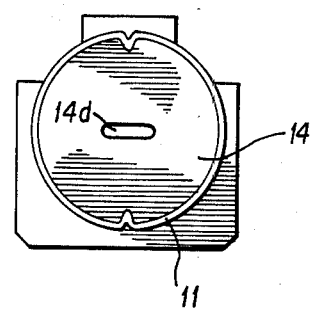
FIG. 4 is a front view showing the cover in a state in which the cover is secured to an open end of a casing.

In the above-noted mounting device 10 of the spiral spring, spring holder 13, in a state in which the outer end of the spiral holder 13 is engaged in advance with the projection 13a of the spring holder 13, is fitted within the casing 11 so as to be brought in contact with wall 11a. Thereafter, the inner end of the spiral spring 12 is securely fitted within the groove 20a of a rotatable shaft 20. Thus, the spiral spring 12 is assembled or mounted as shown in the drawings. The cover 14 is then fitted within the casing 11 in a manner such that the notches 14a and 14b engagingly receive projections 13a and 13b of the spring holder 13, respectively, so that the cover 14 and the spring holder 13 are incorporated together. The cover 14 may be rotated in its clockwise direction by engagement of a corresponding tool in a notch 14d provided in the outer surface of the cover 14 whereby the biasing force of the spiral spring 12 can be easily adjusted. After the above adjustment of the biasing force of the spiral spring 12, the cover 14 is prevented from freely rotating by an interference provided by engagement of the O-ring 15 between the cover 14 and the casing 11. Thereafter, the open end of the casing 11 is sealed as shown in FIG. 4 and, therefore, the spiral spring 12 is completely set.

In the above embodiment, the cover 14 is securely positioned directly within the casing 11 by the sealing of casing 11, however, the cover 14 may be positioned within the casing by means of another member 23 such as a seal member of epoxy resin when the member 23 is secured to the open end of the casing 11.

While a preferred embodiment of the invention has been described, it will be readily apparent to those skilled in the art that various changes and arrangements can be made to accomplish the objects of the invention without departing from the scope and spirit of the appended claims.

What is claimed as new and desired to be secured by Letters Patent of the United States is:

1. A mounting device for a spiral spring, comprising:
   a rotatable shaft;
   a casing having a wall through which a first end of said rotatable shaft extends;

spiral spring means for biasing said rotatable shaft in one direction, said spiral spring means having an inner end which is engaged with said first end of said rotatable shaft;

a spring holder positioned within said casing and having a first projection extending therefrom with which an outer end of said spiral spring means is engaged;

cover means fitted within said casing for covering said spiral spring means and engaging with said spring holder so as to be rotated therewith and for thereby adjusting the biasing force of said spiral spring means; wherein said rotatable shaft has a groove formed therein and wherein said spiral means has an inner end portion which is fitted within said groove formed in said rotatable shaft and said cover means further comprises a first and second notch formed therein and an annular groove formed on the outer periphery thereof and wherein said spring holder further comprises a second projection extending therefrom such that said first and second projections of said spring holder are received within said first and second notch, respectively, of said cover means; and an O-ring installed in said annular groove hermetically sealing an open end of said casing and preventing free rotation of said cover means by an interference provided by engagement of said o-ring between the cover means and the casing.

2. A mounting device for a spiral spring as set forth in claim 1, wherein said first projection further comprises a pin-shaped projection.

3. A mounting device for a spiral spring a set forth in claim 1, wherein said cover means further comprises means formed in said cover means for adjusting a biasing force of said spiral spring means.

4. A mounting device for a spiral spring as set forth in claim 3, wherein said means formed in said cover means for adjusting a biasing force of said spiral means further comprises a third notch formed in an outer surface of said cover means and engageable with a corresponding tool for rotating said cover means.

* * * * *

UNITED STATES PATENT AND TRADEMARK OFFICE
CERTIFICATE OF CORRECTION

PATENT NO. : 4,552,249

DATED : NOVEMBER 12, 1985

INVENTOR(S) : MOTONOBU AKAGI

It is certified that error appears in the above-identified patent and that said Letters Patent is hereby corrected as shown below:

Column 1, line 55, insert -- spring -- between "spiral" and "according";

Column 1, line 60, change "front" to -- frontal --.

Signed and Sealed this

Thirteenth Day of May 1986

[SEAL]

Attest:

DONALD J. QUIGG

Attesting Officer

Commissioner of Patents and Trademarks